United States Patent [19]

Young et al.

[11] 3,818,611
[45] June 25, 1974

[54] APPARATUS FOR CONDUCTING PROGRAMMED PSYCHOTHERAPY

[75] Inventors: Gregory G. Young; Melvin C. Eifert, both of Dayton, Ohio

[73] Assignee: Gregory G. Young, Dayton, Ohio

[22] Filed: May 10, 1973

[21] Appl. No.: 359,119

[52] U.S. Cl. .................................. 35/9 F, 35/22 R
[51] Int. Cl. ............................................. G09b 3/06
[58] Field of Search ........... 35/9 F, 22 R; 282/16 R, 282/16 C

[56] References Cited
UNITED STATES PATENTS

| | | | |
|---|---|---|---|
| 2,169,266 | 8/1939 | Matter | 35/9 F |
| 2,819,071 | 1/1938 | Dietz et al. | 282/16 R X |
| 2,915,833 | 12/1959 | Genest | 35/9 F UX |
| 2,919,934 | 1/1960 | Davidson et al. | 282/16 C |
| 3,107,435 | 10/1963 | Skinner | 35/9 F |
| 3,116,564 | 1/1964 | Sanford | 35/9 F |
| 3,146,532 | 9/1964 | Shwisha et al. | 35/9 F |
| 3,174,233 | 3/1965 | Kobler et al. | 35/9 F |
| 3,212,199 | 10/1965 | Clark | 35/9 F UX |
| 3,284,924 | 11/1966 | Parmenter | 35/9 F |

Primary Examiner—Wm. H. Grieb
Attorney, Agent, or Firm—Jacox & Meckstroth

[57] ABSTRACT

A paper web or strip having marginal feed holes, is printed at longitudinally spaced intervals with a prescribed psychotherapy program consisting of a series of selected problems. Each problem on the strip is followed by multiple choice alternative solutions which are followed on the strip by the correct solution and a space for the patient's comment. The strip is automatically advanced in alternating increments of different lengths by depressing a push button which actuates a motor connected to drive pin wheels engaging the feed holes. The strip is directed past a window partially closed by a transparent panel so that when the button is first depressed, a problem and the corresponding multiple choice solutions are presented within the window. After the patient selects a solution, he again depresses the button so that the problem and multiple choice solutions are positioned under the transparent panel while the correct solution and the space for a written comment are positioned within the open part of the window.

8 Claims, 4 Drawing Figures

PATENTED JUN 25 1974　　　　　　　　3,818,611

APPARATUS FOR CONDUCTING PROGRAMMED PSYCHOTHERAPY

BACKGROUND OF THE INVENTION

In the art of teaching machines or devices which have been either proposed or constructed for presenting a series of questions to a person being tested, there have been various machines adapted for receiving a paper web or strip having a series of questions and multiple choice answers printed thereon. The strip is usually advanced past a window within the top wall of a register-like cabinet so that the person being tested can conveniently read the questions and choose an answer to each question. For example, U. S. Pat. No. 2,915,833, No. 3,116,564, No. 3,146,532, and No. 3,284,924 each disclose a register-type teaching machine or device for presenting a series of questions to an individual being tested. The machines also provide for the individual to record his answer and subseqently review or inspect the correct answer after the strip is advanced.

The testing machines or devices shown in the above patents, however, are not suitable for use in treating a patient by programmed psychotherapy. For example, in psychotherapy treatment, it has been found desirable for the patient to read a presented problem and a series of alternative solutions to the problem and then be provided with some means for selecting his choice of alternative solutions to the problem. The choice should represent either the patient's true thoughts and/or his feelings as a result of his exposure to the problem or which seems to be the most appropriate response to the problem. In addition, it is highly desirable to present to the patient the correct or preferred solution to the problem and a space for recording his comments concerning his reaction to the problem, the solution selected and the correct solution indicated while maintaining his exposure to the problem and the alternate solutions provided.

The comments are especially helpful if the patient's selected solution is different from the correct or preferred solution. After the patient's comments are recorded, it is then desirable to remove the problem, the solutions and the patient's comments when the next problem and multiple choice solutions are presented. It is apparent from a careful analysis of the disclosures of the above patents, that none of the testing machines disclosed in the patents provides the above features which are very important for effective psychotherapy treatment.

SUMMARY OF THE INVENTION

The present invention is directed to an improved apparatus for use in programmed psychotherapeutic treatment of a patient and which provides all of the desirable features mentioned above. In addition, the apparatus of the invention is basically simple and economical in construction and incorporates the use of a paper strip on which an individualized program can be quickly and conveniently produced. The program consists of a series of preselected problems which are set forth on a paper web or strip and are seqentially presented to the patient for obtaining the patient's reaction to each problem. The reaction is determined by his choice of solutions to the problem and his comments with respect to the problem and any differences between his chosen solution and the correct or preferred solution to the problem.

In accordance with the illustrated embodiment of the invention, a program is produced for a patient with the aid of a tape controlled automatic typewriter which types selected problems on a continuous web of paper at longitudinally spaced intervals. A series of multiple choice alternative solutions follows each of the problems presented on the web, and the multiple choice solutions are followed on the web by the correct solution and a space for receiving the patient's comment. The web is adapted to be zig-zag folded and inserted into a register which encloses motor driven feed wheels for engaging longitudinally spaced feed holes within the margins of the strip. The motor is actuated by a mechanism which advances the web in alternating increments or steps of different lengths so that each problem and corresponding multiple choice alternative solutions are sequentially presented within a window within the top of the register.

A transparent panel covers the upper portion of the window and the lower portion of the window is open so that the patient can mark his choice of solutions to the problem. The next advancement of the strip is effective to locate the question and multiple choice solutions below the transparent panel, and the correct solution and a space for the patient's comment appears within the open portion of the window. Thus the problem and multiple choice alternative solutions remain in view to the patient while he compares the correct or preferred solution with his chosen solution and records his comments to the entire situation or transaction.

Other features and advantages of the invention will be apparent from the following description, the accompanying drawings and the appended claims.

DESCRIPTION OF THE PREFERRED EMBODIMENT

Figure 1:
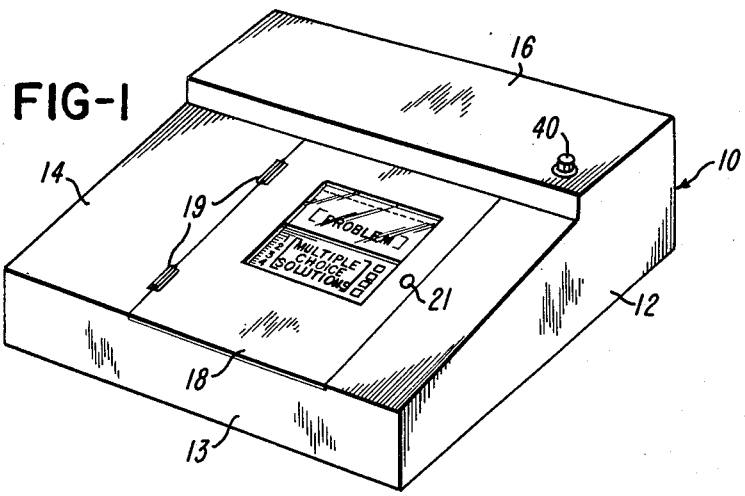
FIG. 1 is a perspective view of apparatus for conducting programmed psychotherapy and which is constructed in accordance with the invention.

The device or machine shown in FIG. 1 includes a cabinet 10 having a set of side walls 12 rigidly connected by a front wall 13, a front top wall 14 and a rear top wall 16. The cabinet 10 encloses an automatic register of a general type disclosed in U. S. Pat. No. 2,919,934. The register is accessible within the cabinet 10 by means of an opening within the top wall 14 and which is normally closed by a door 18 supported by a set of hinges 19 connected to the top wall 14. A key actuated lock 21 provides for securing the door 18 and enables the door to be opened for inserting and removing an elongated paper web or strip 25 which is zig-zag folded along longitudinally spaced lines 26 of cross perforations defining a corresponding series of form-like sections 28.

Figure 4:
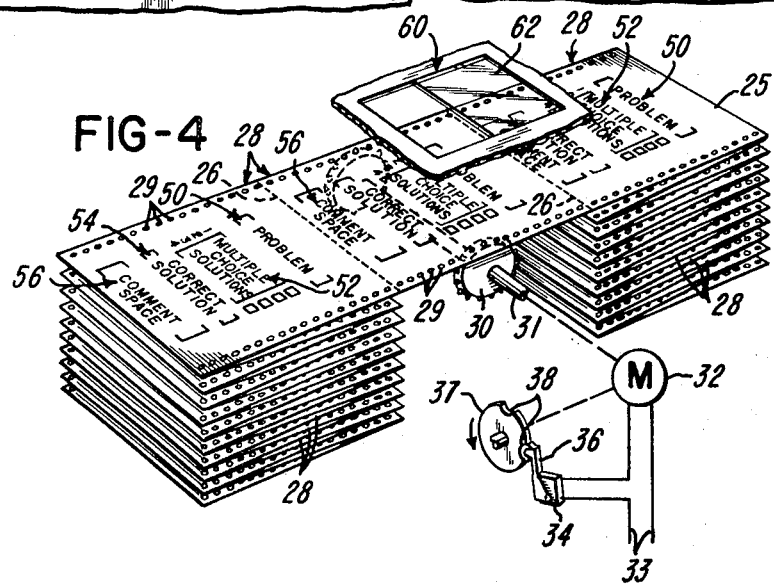
FIG. 4 is somewhat of an exploded perspective view illustrating generally the format of a program set forth on the strip and diagrammatically the means for advancing the strip under the viewing window.

The paper web or strip 25 is provided with longitudinally spaced feed holes 29 within its margins, and the marginal feed holes are engaged by a corresponding set of pin wheels 30 mounted on a shaft 31 connected to be driven by an electric motor 32. The motor 32 receives its power through electrical power supply lines 33 and is controlled by a switch 34. As schematically illustrated in FIG. 4, the switch 34 includes an actuator 36 which pivots in response to rotation of a control cam plate 37 having a pair of circumferentially spaced notches or recesses 38 for receiving the actuator 36. The cam plate 37 is driven by the motor 32 in timed relation with the shaft 31.

The details of the drive mechanism for intermittently rotating the pin wheel shaft 31, are disclosed in U.S. Pat. No. 2,819,071. This patent shows the manner by which the motor 32 is energized in response to depressing an actuator button 40 projecting upwardly from the upper rear wall 16 of the cabinet 10. When the motor 32 is energized, the cam plate 37 rotates until the switch 34 opens as a result of the actuator 36 engaging one of recesses 38 within the cam actuator plate 37. For reasons which will be explained later, the recesses 38 within the cam plate 37 are arranged so that the web or strip 25 alternately advances in increments or steps of approximately 2 inches and 6 inches.

As illustrated in FIG. 4 and mentioned above, the paper strip 25 is provided with a program specifically created for a particular patient being treated. The program includes a series of longitudinally spaced problems 50 one for each of the strip sections 28. Each problem 50 on the strip 25 is followed by a series of multiple choice alternative solutions 52 having corresponding boxes 53 so that the patient being treated can choose his solution to the problem. Following each of the multiple choice alternative solutions 52 on each strip section 28, the correct or preferred solution 54 to the problem 50 is set forth, and following each correct solution 54, is a space 56 for receiving the patient's comment.

The individualized program of a series or problems and corresponding multiple choice alternative solutions and corrent solutions, is typed on the paper strip 25 with a typewriter controlled by a magnetic or punched tape. The tape is coded according to a predetermined selection of problems and controls the typewriter so that the problems 50, multiple choice solutions 52, correct solution 54 and comment spaces 56 are typed on the corresponding sections 28 of the strip 25 according to a predetermined logitudinal spacing.

Figures 2, 3:
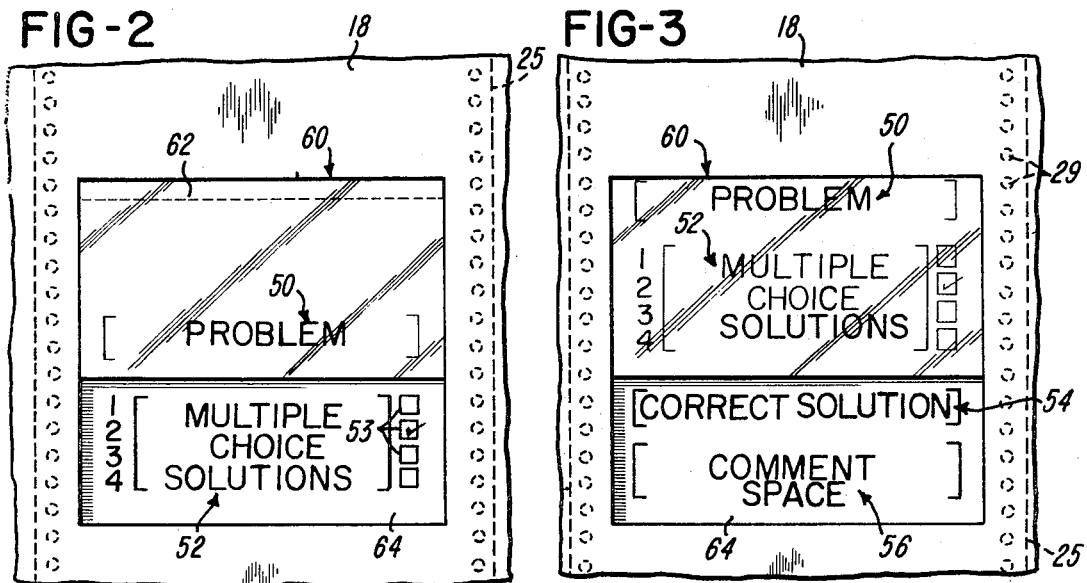
FIG. 2 is an enlarged fragmentary plan view of the apparatus shown in FIG. 1 and illustrating the position of the strip in relation to the viewing window after the first advancement of the strip.
FIG. 3 is a view similar to FIG. 2 and illustrating the position of the strip relative to the window following the next step of advancement.

A generally square or slightly rectangular window 60 is formed within the cabinet door 18 overlying the path of the paper strip 25. The upper portion of the window 60 is closed by a transparent panel 62 (FIG. 2) of glass or plastics material. The lower portion of the window 60 defines a rectangular opening 64 which extends across the width of the strip 25. As shown in FIGS. 2 and 3, the tranpsarent panel 62 encloses slightly more than one half of the window 60. For example, in one system which provided satisfactory results, the transparent panel 62 had a height of approximately 3 ¾ inches, and the opening 64 had a height of approximately 2 ⅝ inches. In this unit, the spacing between the lines 26 or cross perforations within the program strip 25, was approximately 8 ½ inches.

The apparatus shown in the drawing is used in the following manner. A zig-zag folded strip 25 imprinted with a predetermined program, is positioned within the lower portion of the cabinet 10. The leading edge of the strip is placed on the pin drive wheels 30 so that the initial problem 50 can be viewed through the transparent panel 62 (FIG. 2), and the multiple choice alternative solutions 52 are exposed within the opening 64. After the patient reads the problem and selects one of the multiple choice solutions by placing a mark within the corresponding box 53, the patient depresses the button 40. The motor 30 is energized for a relatively short time period as determined by the closest circumferential distance between the notches 38 within the actuating plate 37. The strip 25 advances until the problem 50 and the multiple choice solutions 52 are located under the transparent panel 62, as shown in FIG. 3. Advancement of the strip 25 also presents the correct solution 54 within the opening 64 along with the space 56 in which the patient has been requested to record any comments which he might have in regard to the problem 50, the alternative solutions 52 and the correct or preferred solution 54 to the problem.

When the button 40 is depressed again, the strip 25 is advanced by a greater distance or step so that the next problem on the strip 25, appears within the window 60 as illustrated in FIG. 2. The process is repeated until the patient has answered all of the problems presented by the programmed strip 25. The patient's response to each problem and his corresponding comments are evaluated by the therapist who generated the program. It has been found that comments of the patient are particularly helpful in obtaining further insight into the patient's thinking and his mental condition.

Thus from the drawing and the above description, it is apparent that the arrangement or format of the program on the paper strip 25 cooperates with the window 60 and the advancement of the strip 25 in alternating steps of different lengths, to assure that each problem and the corresponding alternate solutions can be reviewed by the patient after the correct solution and the space for comment are presented to the patient. As mentioned above, this feature is highly desirable in providing for programmed psychotherapy. That is, by obtaining the patient's comments while he has an opportunity to compare his chosen solution with the alternative solutions and the problem, provides for obtaining meaningful information which can be used in treating the pateint.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. Apparatus for use in psychotherapeutic treatment of a patient, comprising an elongated flexible paperlike strip having a series of problems arranged thereon at longitudinally spaced intervals, each problem being followed on the strip by a plurality of alternative solutions which are followed by a preferred solution and a space for recording a written comment of the patient, a cabinet for receiving the strip and having an upper wall, means defining a window within said upper wall and having an open portion, a substantially transparent panel within another portion of said window, means for advancing the strip under said window, means for actuating said strip advancing means for a first time period to advance the strip by a first step for presenting a problem under said panel and for locating the corresponding alternative solutions within said open portion of said window, and means for actuating said strip advancing means by a second time period shorter than said first time period to advance the strip by a second step of a shorter distance than said first step for moving the alternative solutions under said transparent panel with the problem and for presenting the preferred solution within said window and the space for comment within the open portion of said window.

2. Apparatus as defined in claim 1 wherein the strip includes means defining a series of longitudinally spaced marginal feed holes, said means for advancing the strip includes movable pin wheels for engaging said feed holes, a motor for driving said pin wheels, and said actuating means being effective to actuate said motor alternately for said first and second time periods to effect alternating advancement of the strip by said first and second steps.

3. Apparatus as defined in claim 1 wherein said window is substantially rectangular, and said transparent panel is substantially rectangular and encloses at least one half of said window.

4. Apparatus as defined in claim 1 wherein the preferred solution and the space for the patient's comment are both positioned within said open portion of said window after the strip has been advanced by said second step.

5. Apparatus as defined in claim 1 wherein said strip advancing means comprise an electric motor, a switch for actuating said motor, a cam member for actuating said switch and driven by said motor, and said cam member includes means for controlling the operation of said motor for said first and second time periods.

6. Apparatus as defined in claim 1 wherein each problem is disposed under a first portion of said panel after the strip is advanced by said first step and under a second portion of said panel after the strip is advanced by said second step.

7. Apparatus as defined in claim 1 wherein said transparent panel extends laterally across the entire width of said window and cooperates to define said open portion of said window.

8. A method for conducting psychotherapeutic treatment of a patient, comprising the steps of forming on a paper-like strip a program including a series of problems arranged at longitudinally spaced intervals, following each problem on the strip with a plurality of multiple choice alternative solutions, following each group of alternative solutions on the strip with a preferred solution and a space for recording a written comment of the patient, presenting to the patient each problem and the corresponding alternative solutions for choosing of a solution by the patient, and then presenting to the patient the corresponding preferred solution to the problem along with the corresponding space for comment while the problem and alternative solutions to the problem remain viewable but not accessible by the patient.

* * * * *